United States Patent [19]
Gurta et al.

[11] 3,885,899
[45] May 27, 1975

[54] APPARATUS FOR EXPANDING A LAMINATING INTERLAYER

[75] Inventors: Daniel J. Gurta, Westland; George A. Koss, Dearborn Heights, both of Mich.

[73] Assignee: Ford Motor Company, Dearborn, Mich.

[22] Filed: Aug. 5, 1974

[21] Appl. No.: 489,272

[52] U.S. Cl. ............... 425/150; 425/366; 425/335; 264/292
[51] Int. Cl. ........................ B29c 17/00; B29d 7/24
[58] Field of Search .......... 425/135, 138, 150, 335, 425/366, 149, 144; 264/292

[56] References Cited
UNITED STATES PATENTS

| | | | |
|---|---|---|---|
| 3,019,475 | 2/1962 | Smith | 425/335 |
| 3,647,309 | 3/1972 | Thompson | 425/150 X |
| 3,667,884 | 6/1972 | Reinfeld | 425/149 |
| 3,693,946 | 9/1972 | Merritt | 425/145 X |
| 3,696,186 | 10/1972 | Stark et al. | 264/292 |
| 3,767,341 | 10/1973 | Siebelkoff | 425/150 |
| 3,825,386 | 7/1974 | Bello et al. | 425/150 |

*Primary Examiner*—J. Howard Flint, Jr.
*Attorney, Agent, or Firm*—William E. Johnson; Keith L. Zerschling

[57] ABSTRACT

An apparatus for expanding a laminating interlayer is taught. The apparatus includes structure for feeding a heated web of laminating interlayer material to a conical member. A stretching of the web occurs between the feeding structure and the conical member. The web is cooled on the conical member. The apparatus also includes structure which keeps the web aligned with a particular portion of the conical member so that the web of material is stretched uniformly along extended lenths thereof.

6 Claims, 4 Drawing Figures

APPARATUS FOR EXPANDING A LAMINATING INTERLAYER

BACKGROUND OF THE INVENTION

U.S. Pat. No. 3,696,186 issued Oct. 3, 1972 for a Method of Expanding Pliable material teaches structure for expanding vinyl material which is used as an interlayer in laminating glass templets together in order to form an automotive windshield. This patent also discloses a structure for accomplishing the method described in the patent. This patent and U.S. Pat Nos. 2,933,759 and 3,019,475 disclose methods and apparatuses for stretching a plasticized polyvinyl-butyral web used to form the interlayer of an automotive windshield. The stretching of such material is necessary when a tinted band is placed along one lateral edge of the material so that the material may be used in the formation of a tinted windshield for an automotive vehicle. More particularly, the tinted or gradient band is located at the top of the windshield in order to reduce the light transmission capability of the windshield in that area. This reduction in light transmission aids the operator of the vehicle by reducing the amount of glare he is subject to, thereby improving his field of vision.

When the gradient band windshield has both horizontal and vertical curvature, it is necessary to stretch each interlayer prior to placing it between two glass templets. This stretching is necessary so that upon lamination of the two glass templets with the interlayer, the edge of the gradient band across the windshield will appear as a straight line when the windshield is assembled in an automobile. In its stretched condition, the interlayer will have the lateral edges thereof formed into curved configurations with different arc lengths. To facilitate the manufacture of the interlayer material, the material is produced in large rolls with the lateral edges thereof in a parallel and straight condition. Many individual interlayers may be formed from one such large roll of material.

The patents mentioned above show methods and apparatuses for stretching the original continuous length of interlayer material into a stretched condition to make it acceptable for use in a laminating procedure. The apparatus of this invention is an improvement over the apparatuses known in the prior art in that the present apparatus assures that continuous lengths of material are stretched to the same condition yet the apparatus is flexible enough to permit rapid change between stretching conditions so that interlayers having various radii of curvature may be manufactured on the same apparatus.

SUMMARY OF THE INVENTION

An apparatus for expanding a laminating interlayer is disclosed. The apparatus includes a feeding device for feeding a continuous web of laminating interlayer material from a supply thereof. A heating device is associated with the feeding device for heating the web to a temperature whereat it is more pliable. The heating and feeding devices are in a stationary position. A movable platform is located adjacent the last two mentioned devices. A controllable structure is provided for moving the movable platform in a direction across the path of travel of the web being fed from the feeding device. A cooling cone structure is provided both for applying a stretching force to and for cooling the web, the cooling cone structure having a slant height greater than the width of the web whereby a different radius of curvature may be developed in the web depending upon the location along the slant height of the cooling cone structure over which the web passes. Additional structure is provided for rotatably mounting the cooling cone structure on the movable platform. An edge position sensing device is secured to the platform for sensing the location of one edge of the web at a position between the feeding device and the cooling cone structure. The edge position sensing device develops a signal indicative of the location of the edge of the web with respect thereto. Structure is provided which is responsive to the signal of the edge position sensing device for operating the controllable structure to adjust the movable platform to keep the edge of the web located in a particular position with respect to the edge position sensing device and thereby with a particular location along the slant height of the cooling cone structure.

The apparatus of this invention keeps the web continuously aligned with a particular position along the slant height of the cooling cone structure whereby the web continuously passes over the same portion of the cooling cone structure and is thereby stretched the same. The structure also permits the location at which the web passes over the cooling cone structure to be changed rapidly by simply moving the edge position sensing device with respect to the edge of the web. By moving the edge sensing device in this manner, the movable platform is moved by the controllable structure whereby the web passes over a new position on the cooling cone structure and therefore has a different ratio of stretching applied to the web edges.

DESCRIPTION OF THE PREFERRED EMBODIMENT

Construction

In the formation of an automotive safety windshield, a pair of glass templets are laminated together with an interposed sheet of a plasticized polyvinyl-butyral. The glass templets have an approximate thickness of 0.100 inch and the interlayer has a thickness of approximately 0.03 inch. The formation of such a laminated assembly is well known in the art. In many cases, it is desirable to include in the laminating interlayer a darkened or gardient tint band at the top portion thereof to reduce the amount of light which is allowed to enter into the automotive vehicle through the top portion of the windshield. This particular band is generally known as the gradient band and is preferably graduated with the intensity of coloration decreasing from the top of the windshield to a position spaced from the bottom thereof. Because most modern day automotive windshields have both a horizontal and vertical curvature thereto, it is necessary to stretch the gradient vinyl to the proper curvature prior to laminating the vinyl with the pair of glass templets. More particularly, in order that the end of the gradient tint line in the windshield appear as a uniform horizontal line when the windshield is installed in an automotive vehicle, it is necessary to stretch the interlayer material so that the upper and lower edges thereof have a proper radius of curvature prior to lamination of the material. When the material is stretched, the lower portion of the gradient band is not horizontal. However, when the windshield is installed in an automotive vehicle, the angle of installation of the windshield is such that the bottom of the band will appear as a straight line when viewed from the exterior of the automobile.

The vinyl material used for the interlayer, as purchased, is in a continuous roll wherein the opposite lateral edges thereof are in substantially parallel relationship. As a final expanded product, finite lengths of the interlayer are formed from the roll in such a configuration that the upper and lower lateral edges of the interlayer are stretched to curved configurations of different arc lengths. The upper edge of the gradient band interlayer is of smaller arc length than the lower edge thereof.

Figure 1:
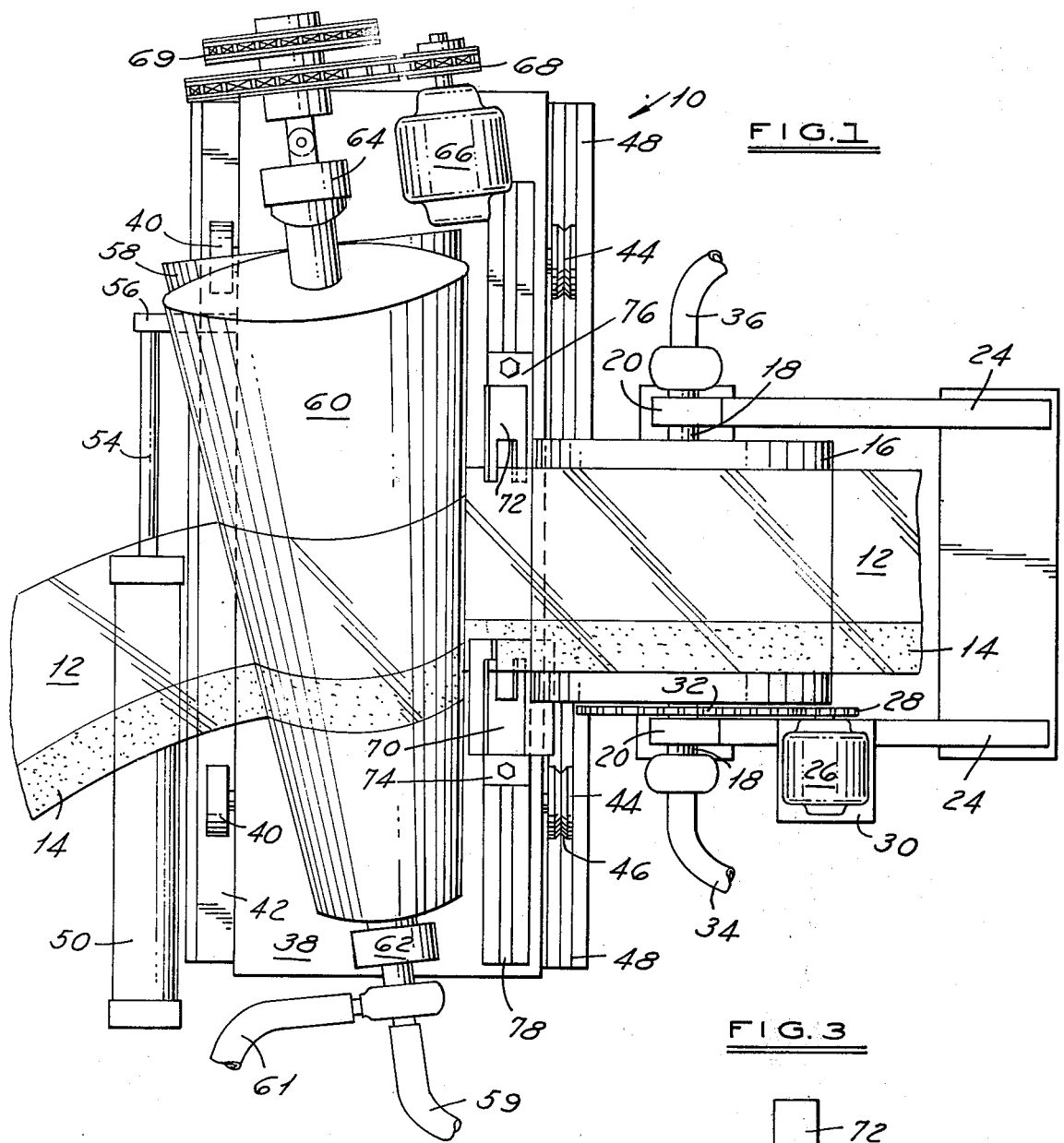
FIG. 1 is a plan view of the apparatus of this invention.
Figure 3:
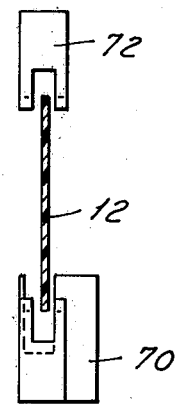
FIG. 3 is a view taken along line 3—3 of FIG. 2.
Figure 2:
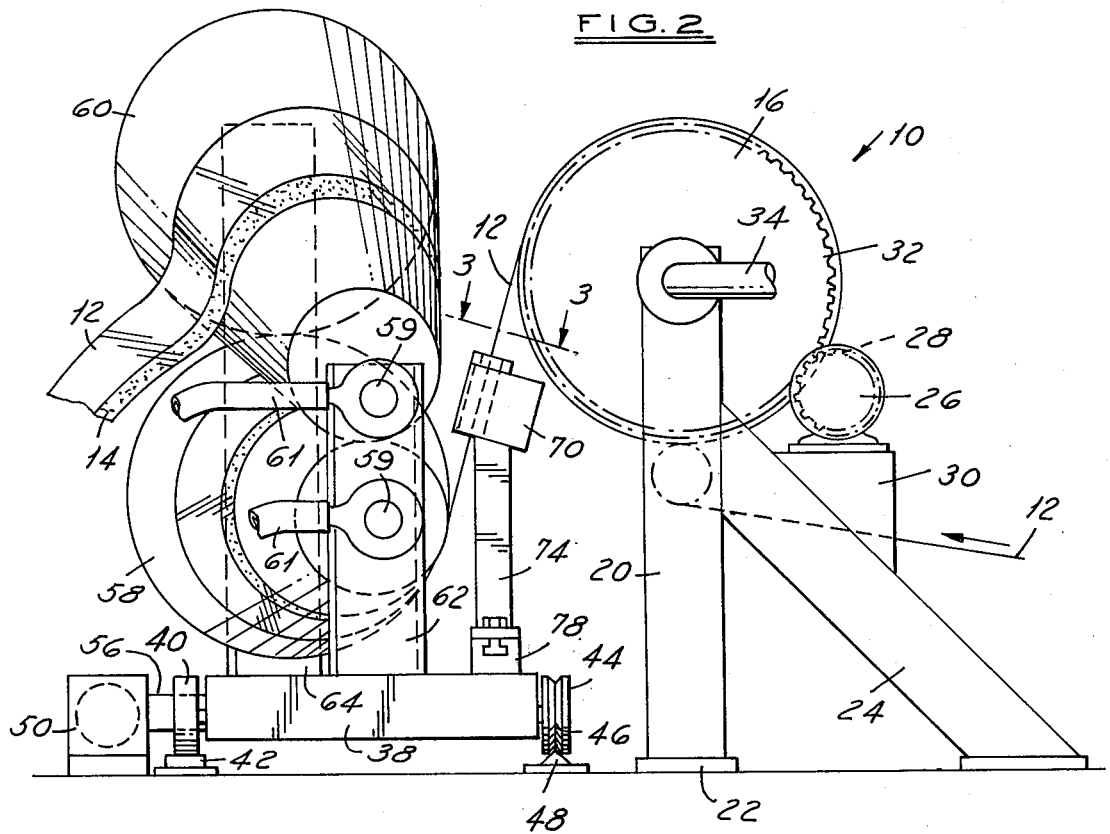
FIG. 2 is a side elevation view of the apparatus of this invention.

The apparatus of this invention for stretching such material will be best understood by reference to the associated drawings wherein the apparatus is generally identified by the numeral 10. With reference to FIGS. 1 and 2 of the drawings, a continuous roll of commercially available, polyvinyl-butyral 12 is shown as it is unwound from a coil thereof (not shown). The roll of vinyl is formed so that one edge thereof has a gradient tinted band 14 therealong. The vinyl material is unrolled and put through a plurality of rinsing solutions at a rinsing station (not shown). At such a rinsing station, water is used to wash from the surface of the vinyl fine dust material which is placed thereon in order to keep the various convolutions of the material in the roll separate during its handling and shipping.

After passing through the rinsing station, the web 12 is passed around a drum 16 which is mounted for rotation on a shaft 18 which in turn is supported by a pair of upstanding members 20. The upstanding members are secured to a base plate 22 and are further supported by brace members 24. A motor 26 is provided which drives a gear 28. The motor is mounted on support structure 30 associated with one of the brace members 24. The gear 28 engages a gear 32 secured to the drum 16.

The shaft 18 supporting the drum 16 has a hollow interior and only extends a portion of the way into the drum on each side thereof. The drum 16 itself is completely enclosed. An inlet pipe 34 and an exhaust pipe 36 are connected at opposite ends of the shaft 18 so that a heating medium may be supplied to the interior of the drum 16. The heating medium is effective to heat the vinyl material which is passing over the surface of the drum.

Adjacent to the stationarily mounted drum 16 and heating structure therefor, is a movable platform 38. As best seen in FIGS. 1 and 2, the left side of the movable platform has a pair of support wheels 40 which are movable over a track 42. The right side of the movable platform is supported by guide wheels 44 having a groove 46 therein which locates the wheels on a guide track 48. An hydraulic cylinder 50 operates a piston 52 which has a rod 54 associated therewith. The rod has a coupling member 56 which connects it to the movable platform 38. The hydraulic cylinder, by movement of the piston, is effective to operate the movable platform to position it in different positions with respect to the stationary drum 16. The manner in which the cylinder 50 is operated to cause movement of the platform will be described hereinafter.

A lower cooling cone 58 and an upper cooling cone 60, both truncated, are shown in the drawings as being rotatably mounted by a front standard 62 and a rear standard 64 to the movable platform 38. While two cooling cones are shown in the drawings, any number of cooling cones may be employed with the apparatus of this invention. For example one or more cooling cones may be employed depending upon the amount of cooling which is necessary to cool the vinyl material. The cooling is carried out by allowing cooling fluid to flow into the cones through inlet pipes 59 and be removed therefrom through exhaust pipes 61. As seen in FIG. 1, a motor 66 has a chain drive 68 associated therewith. The chain drive 68 drives the lower cooling cone 60 and a second chain drive 69 driven by a reversing gear on the lower cooling cone drives the upper cone so that both cones are driven at a desired rotational speed. The motor and chain drives are secured to the movable platform for movement therewith.

As is also best seen in FIG. 1, a first gaging head 70 and a second gaging head 72 are mounted by posts 74 and 76 respectively on the movable platform 38. These gaging heads may be moved any place along a gaging track 78 so as to accomodate the width of vinyl passing therethrough. The gaging heads may also be adjusted so that they are associated with different positions along the slant height of the cones 58 and 60. The gaging heads are adjusted by loosening the bolts which secure their posts to the gaging track 78.

The gaging head 70 is designed to locate the edge of the web and to keep it in a particular position with respect to a location on the cooling cones which has been selected for stretching the vinyl to a particular configuration having certain desired upper and lower radii of curvature. In particular, if the web is passed over the lower or small end of the cone near the front standard 62, the radii of curvature developed on the upper and lower surfaces thereof will be smaller than if the web is passed over the large end of the cone near the rear standard 64. The structure of this particular invention is designed to accomplish two functions. A first function of the structure is to guide the web of laminating material 12 from the drum 16 onto the same portion of the cooling structure without any variation as to the position thereof so the material continuously is stretched in a manner that the radii of curvature developed are the same. The second function of the apparatus is that the location over which the web passes on the cooling cones may be changed by moving the gaging head 70 in its track relative to the movable platform 38 and then securing the gaging head at a new location.

Figure 4:
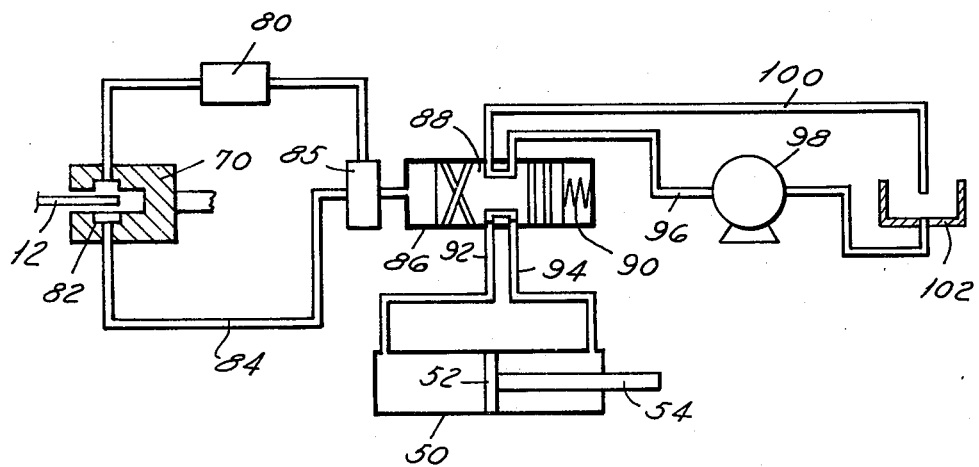
FIG. 4 is a schematic view of the portion of the apparatus of this invention which provides the control system for the apparatus.

The gaging head 70, in this preferred embodiment, takes the form of a system which operates on air pressure. As is best seen in FIG. 4, a source of air pressure 80 provides a continuous flow of air into the gaging head 70. The edge of the web 12 passing through the gaging head is an effective device to change the air pressure which is sensed on the other side of the source of air pressure. As shown in FIG. 4, the edge covers about half of an orfice 82 opposite from the source of air pressure thus providing a certain level of air pressure in an air line 84 and a servo mechanism 85 which amplifies the pressure and applies it to a valve 86. The valve 86 contains a valve element 88 which is biased to the left as viewed in FIG. 4 by a small spring 90. The valve 86 is connected by a line 92 to the piston side of the hydraulic cylinder 50 and by a line 94 to the rod side of the same hydraulic cylinder. The valve is also connected by a line 96 to a pump 98 and by a line 100 to a sump 102. The sump 102 feeds hydraulic fluid to the pump 98. The valve element 88 has three sets of hydraulic connections. When the element is in a neutral, central position, the rod and the piston side of the hydraulic cylinder 50 are blocked and the pump 98 is connected with the sump 102. If the edge of the ribbon 12 is removed from the gaging head 70, air pressure from the source of pressure 80 is applied through the line 84 to the servo 85 which then applies a pressure to the valve element to cause interconnection of the pump with the piston side of the cylinder 50 and the rod side of the cylinder to the sump whereby the rod 54 is moved to the right as viewed in FIG. 4 and upward as viewed in FIG. 1. On the other hand if the web extends entirely into the gaging head 70 to cover the orfice 82, a lower pressure is sensed in the line 84 and the small spring 90 is effective to bias the right hand end of the valve element into operative association with the hydraulic lines whereby the pump 98 is connected to the rod side of the hydraulic cylinder and the sump 102 is connected to the piston side of the cylinder and the piston is moved to the left as viewed in FIG. 4 or downward as viewed in FIG. 1. It is therefore seen that the valve 86 is effective, depending on the signals from the gaging head 70, to position the web 12 accurately on the cooling cones.

OPERATION

The operation of the apparatus of this invention will now be described in detail. The web 12 of commercially available plasticized polyvinyl-butyral is used as the interlayer material. This material is commercially available in lengths of 800 and 1500 feet with various widths, for example of about 30 inches.

In making a particular interlayer, wherein the vinyl has a width of 30 inches, the rate of unwinding and rinsing of the vinyl is 55 feet per minute. The slant height of each cone is 75 inches and the edge of the web having the gradient band 14 therealong passes over the cone at a distance of 10 inches from the small end thereof whereby the radius of curvature developed in the end having the gradient band therealong is 80 inches and the other end is 110 inches.

The web 12 passes from the rinsing station, not shown, over an idler roller and onto the surface of the drum 16. The drum 16 is rotated through the motor 26 operating on gears 28 and 32. With this driving action the web is pulled from its continuous supply through the rinsing station and then onto the surface of the drum. As is apparent from FIG. 2, the web is in contact with the drum surface along a substantial length thereof. During this contact, the web is heated to a temperature in the range of about 220°F by introducing a heating fluid such as steam under pressure through the inlet pipe 34 to the interior of the drum. The heating fluid is effective to heat the vinyl to a temperature whereat it is in a more pliable condition. The heating medium is exhausted from the interior of the drum through exhaust pipe 36. The web reaches its highest temperature at a point approximately where it is removed from the surface of the drum 16. At this point the vinyl web is pliable enough to be stretched.

The pliable web 12 is stretched between the point it leaves the surface of the drum 16 to the point at which it comes into contact with the lower cooling cone 58. The stretching occurs because the points along the slant height of the cone into which the web comes into contact are moving at different velocities and thus apply different forces to the material across its width. The large end of the cone will be traveling at a greater rate of speed and will stretch the web in that vicinity to a greater degree than the web is being stretched by the small end of the cone. The stretching force of the lower cooling cone is developed from the motor 66 acting through the chain drive 68 to drive the cooling cone. As the material is being stretched and is passing from the drum 16 to the lower cone 58, it also has its two edges passing through the gaging heads 70 and 72. The gaging head 72 performs a function which is not of interest in this particular application. The gaging head 70 is used in this apparatus 10 to locate the web material and keep it aligned with the proper position on the cooling cone 58 and to adjust the web's position along the slant height of the cone as is required when different radii of curvature are desired in the web.

As the web passes over the cooling cones 58 and 60, its temperature is reduced to about 50°F. The web is removed from the upper cooling cone and cut into finite lengths. The web is cooled while in contact with the cooling cones by a cooling fluid such as glycol which is introduced into the cooling cones through inlet pipes 59. The cooling fluid flows through the cones, which have internal baffles therein for directing the same in a known manner, and then exhausted through exhaust pipes 61. In such a manner the vinyl web is heated, expanded and cooled prior to being cut into finite lengths in which the gradient band edge has a smaller radius of curvature than the opposite edge and wherein the material is suitable for use as a laminating interlayer between a pair of glass templets.

The web 12 is fed from the drum 16 to a selected position along the slant height of the cone 58 by the action of the gaging head 70. As best seen in FIG. 4, when the web 12 has its location centered within the gaging head 70 in a proper position, a portion of the air pressure developed by the source of air pressure 80 and applied to the orfice 82 is felt in the air line 84 and by the servo 85. This pressure acts through the servo on the valve element 88 to keep it in such a position that the piston and the rod side of the hydraulic cylinder 50 are blocked and the rod 54, through its coupling member 56, does not cause any movement of the movable platform 38 upon which the cooling cones are mounted. However, if the web starts to drift in a direction, for example upwardly as viewed in FIG. 1, taking it out of the gaging head 70 and moving it along the slant height of the cooling cones in a direction towards the large end thereof, more of the orifice 82 will be uncovered and a greater amount of the pressure from the source of air pressure will be felt in air line 84 and the servo 85. This pressure will eventually reach a condition such that the left-hand end of the valve element 88 couples the pump 98 to the piston side of the cylinder 50 and the rod side thereof to the sump whereby hydraulic pressure is applied to the piston 52 causing extension of the rod 54 or movement thereof upwardly as viewed in FIG. 1. This movement through the action of the coupling member 56 causes movement of the movable platform 38 in an upward direction as viewed in FIG. 1 whereby the cooling cones move slightly upwardly underneath the web 12 causing the web to return to its proper location along the slant height of the cone. This movement also brings the gaging head 70 back into a position associated with the edge of the web in which the web covers about half of the orifice 82 thereby reducing the air pressure in air line 84 and servo 85 and causing the valve element to return to its central or neutral position.

If the web 12 moves inwardly into the gaging head 70 to an extent such that it blocks almost the entire orifice 82, a lower pressure is felt in the air line 84 and servo 85 causing the right end of the valve element to couple the pump 98 to the rod side of the cylinder 50 and the sump to the piston side thereof whereby the rod is drawn into the cylinder causing movement of the cone downwardly as viewed in FIG. 1 and causing movement of the web upwardly along the slant height of the cone to return to its initial position. During this movement, the gaging head 70 moves relative to the edge of the web to a point where the edge is once more in the center which causes the valve element 88 to seek its neutral or central position.

If one desires to change the position at which the web 12 is being applied to the cooling cones so that different radii of curvature are developed in the upper and lower edges thereof, it is necessary to unbolt the gaging head 70 and move it in a selected direction towards the small or large end of the cone, which action causes a relative movement of the web's edge and the gaging heads 70 which causes associated movement of the platform 38 as previously described. When the position is reached at which the material is to be stretched on the cooling cones, the gaging head 70 is fastened again to its gaging track 78.

There has been described herein an apparatus for stretching vinyl in which the vinyl is held at a particular location on the stretching cone to assure that the vinyl is expanded continuously as desired. The apparatus also is one which permits easy change from expansion to one set of conditions to expansion with a different set of conditions.

What we claim is:

1. An apparatus for expanding a laminating interlayer which comprises:
    feeding means for feeding a continuous web of laminating interlayer material from a supply thereof;
    heating means associated with said feeding means for heating said web to a temperature whereat it is pliable, said heating means and said feeding means being stationary;
    a movable platform adjacent to said last two mentioned means;
    controllable means for moving said movable platform in a direction perpendicular to the path of travel of said web being fed from said feeding means;
    cooling cone means both for applying a stretching force to and for cooling said web, said cooling cone means having a slant height greater than the width of said web whereby a different radius of curvature may be developed in said web depending upon the location along the slant height of said cooling cone means over which said web passes;
    structure means for rotatably mounting said cooling cone means on said movable platform;
    edge position sensing means secured to said platform for sensing the location of one edge of said web at a position located between said feeding means and said cooling cone means, said edge position sensing means developing a signal indicative of the location of said edge with respect thereto; and
    means responsive to the signal of said edge position sensing means for operating said controllable means to adjust said movable platform to keep said edge of said web located in a particular position with respect to said edge position sensing means and thereby with a particular location along the slant height of said cooling cone means.

2. The apparatus of claim 1 wherein: said feeding means includes a large surface over which said web is moved, and wherein: said heating means supplies heat to said web by heating said surface of said feeding means over which said web is moved.

3. The apparatus of claim 1 wherein: said controllable means is a piston and cylinder arrangement to which hydraulic pressure may be applied to cause operation thereof, and wherein said means for operating said controllable means is a hydraulic system.

4. The apparatus of claim 1 wherein: said cooling cone means includes more than one cooling cone.

5. An apparatus for expanding a laminating interlayer which comprises:
    a drum;
    first structure means for rotatably mounting said drum at a fixed location;
    a motor rotatably driving said drum to draw over a major portion of its surface a continuous web of laminating interlayer material from a supply thereof;
    heating means for supplying a heating fluid internally of said drum to heat said web as it passes over said surface of said drum to a temperature whereat said material of said web is pliable;
    a platform;
    second structure means for movably mounting said platform adjacent said drum, said platform being movable in a direction perpendicular to a path of travel of said web leaving said feeding drum after being heated;
    a hydraulic cylinder having a cylinder and a piston, said piston being connected to said platform, said cylinder positioning said platform by moving said piston in accordance with the application of hydraulic pressure thereto;
    a cooling cone having a slant height greater than the width of said web;
    third structure means for rotatably mounting said cooling cone on said platform;
    a motor rotatably driving said cooling cone so that said cone applies a stretching force to said web as said web moves from said drum to said cone;
    cooling means for supplying a cooling fluid internally of said cooling cone to cool said web as it passes over the surface of said cooling cone;
    an edge position sensing device developing a signal indicative of the location of an edge of said web with respect thereto;
    fourth structure means for mounting said edge position sensing device on said platform at a location where said web passes thereby as it moves from said drum to said cooling cone; and hydraulic means controlled by said signal from said edge position sensing device for supplying hydraulic fluid to said hydraulic cylinder, whereby said platform is moved to keep said edge of said web located in a particular position with said edge position sensing device and thereby with a particular location along the slant height of said cooling cone.

6. The apparatus of claim 5 wherein: a second cooling cone is also rotatably mounted on said third structure means, the cones being located so that slant heights on each cone are juxtaposed.

* * * * *